(No Model.)
A. GUILLAUME.
APPARATUS FOR EXTRACTING METALS.
No. 531,309. Patented Dec. 25, 1894.
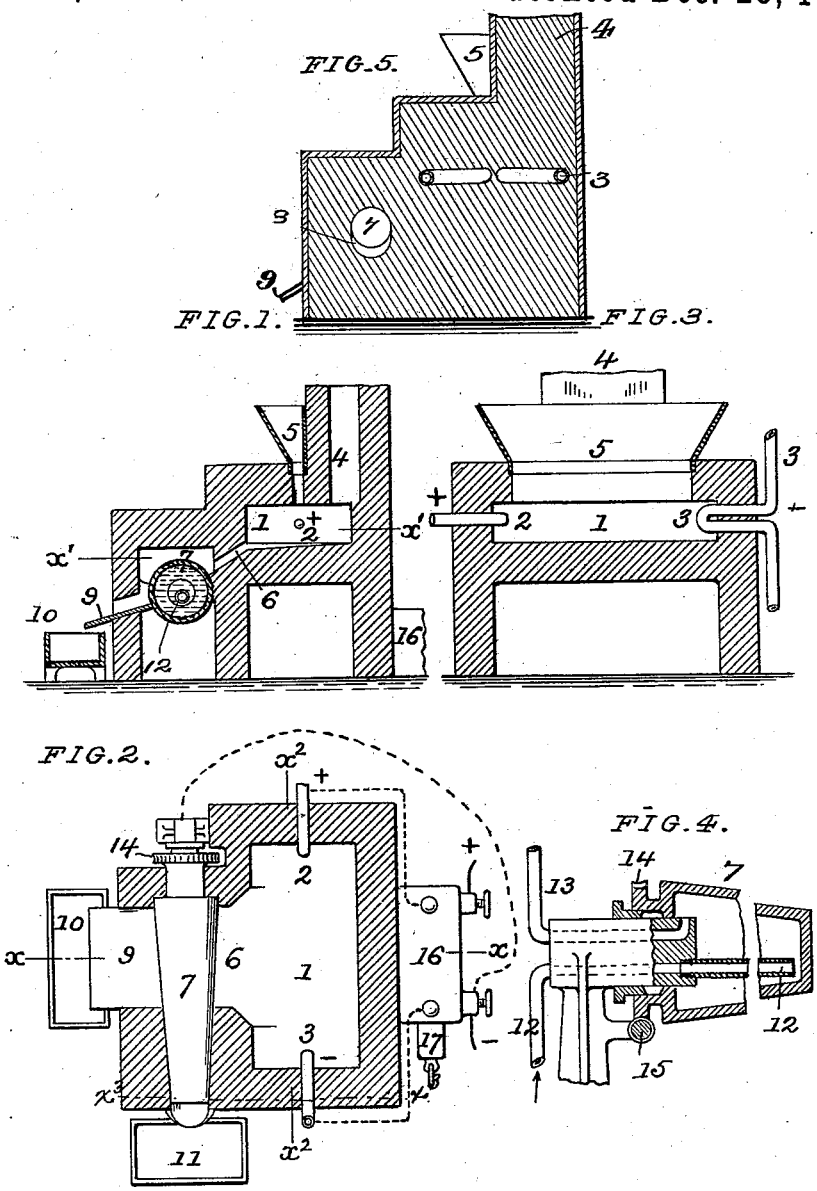
ATTEST:
Geo H Arthur
M. H. Holmes
INVENTOR:
Alfred Guillaume,
by Robert Burns
Attorney.

UNITED STATES PATENT OFFICE.

ALFRED GUILLAUME, OF CHICAGO, ILLINOIS, ASSIGNOR TO THOMAS T. OLIVER, OF SAME PLACE.

APPARATUS FOR EXTRACTING METALS.

SPECIFICATION forming part of Letters Patent No. 531,309, dated December 25, 1894.

Application filed January 30, 1892. Serial No. 419,815. (No model.)

*To all whom it may concern:*

Be it known that I, ALFRED GUILLAUME, a citizen of the United States, residing at Chicago, in the county of Cook and State of Illinois, have invented certain new and useful Improvements in Apparatus for Extracting Metals, of which the following is a specification.

My invention relates to the class of apparatus for treating electrically, minerals, and compounds generally containing metals, to separate therefrom their contained metals.

The primary object of my improvement is to provide an apparatus for extracting metal from a mass of metal-bearing material introduced into it in molten condition, by charging the molten mass with a positive current of electricity and passing it over a body presenting a solid-metal surface negatively charged with electricity, whereby the metal, contained in the molten mass shall be deposited on and adhere to and thus be intercepted by the negatively charged surface; and the slag will tail off.

My further object is to so combine my said improved extracting apparatus with a preparatory fusing and metal-separating apparatus, wherein the refractory material to be treated is subjected to and fused by the heat of the electric arc, as to render the primary melting and separating and subsequent extracting steps a single continuous operation.

My object is, also, to improve the preparatory fusing and separating apparatus by adapting it to permit, readily, variation in the current according to requirement for different metals in the matter of degree of heat of the arc; and my object is, furthermore, to render the secondary extracting apparatus especially desirable as to details in its construction.

Referring to the accompanying drawings—

Figure 1 shows my improved apparatus by a vertical transverse section taken at the line $x$—$x$ on Fig. 2. Fig. 2 is a horizontal section of the same taken at the line $x'$—$x'$ on Fig. 1. Fig. 3 is a vertical longitudinal section of the same taken at the line $x^2$—$x^2$ on Fig. 2. Fig. 4 is a broken enlarged view in section of the preferred tapering-drum form of the negatively charged metal body, showing the attachments with which it is provided. Fig. 5 is a vertical section of the apparatus like that shown by Fig. 1, but taken at the line $x^3$—$x^3$ on Fig. 2, and omitting the resistance-box with its connections and the ultimate metal-receiver.

1 represents the fusion-chamber of a furnace, in which ore, or compound containing metal (and all, for the sake of brevity, hereinafter referred to as ore) is fused by the heat of an electric arc produced between the positive and negative poles, 2 and 3, of an electric-current generator, (dynamo—not shown) these poles being represented in the form of carbons suitably arranged in the opposite walls of the furnace. The fusion-chamber is provided with a stack or uptake 4, for the gases and vapors generated in the smelting operation; a top orifice 5 provided with a hopper, through which to feed the material to be fused between the electrodes 2 and 3, and a side-outlet 6 for the molten material.

As will be readily understood, the various metals contained in ore are liable to be such as fuse at different temperatures, as, for example, lead, copper, zinc and silver. If, therefore, the intensity of heat of the arc formed between the electrodes 2 and 3 were invariable and sufficient to melt, say, the silver, the other metals in the ore subjected to the heat of the arc would be dissipated in fumes by melting the silver. To obviate this, I provide a resistance-box 16 in the circuit, of any desired or well-known construction and provide it with a switch 17, preferably of the sliding variety, by adjustment of which the current may be modified to produce different desired degrees of heat in the arc. Then if ore such as that described is being treated, the arc may be regulated to fuse, first, the metal which melts at the lowest temperature, and which may pass off at the outlet 6. Thereafter the resistance in the circuit may readily be reduced to an extent intensifying the heat of the arc to a degree sufficient to melt the metal which fuses at the next higher temperature; and so on till each of the metals contained in the ore has been melted and run off.

The molten mass which flows off at the outlet 6 from the chamber 1 is metal, but is mixed with impurities; and the slag which runs off at the outlet contains more or less metal which it is desirable to save. To intercept this metal or extract it from the refuse matter I provide my secondary extracting apparatus hereinbefore referred to, and into which the outlet 6 opens; and the following is a description thereof:

In a suitable housing is supported a metal body 7, the nature of the metals composing it varying according to the particular purpose for which it is to be used. Thus if it be intended for intercepting, by electro-deposition upon it, gold or silver, I form it of aluminum-bronze (ninety-five per cent. of copper and five per cent. of aluminum); while for the baser metals I prefer to form it of aluminum-steel (ninety-five per cent. of steel and five per cent. of aluminum). The metal body is negatively electrified, preferably by connecting it, as indicated in Fig. 2, with the negative pole of the generator containing the electrodes 2 and 3 in its circuit.

To render my secondary extracting apparatus capable of continuous operation, I form the body 7 as a drum or cylinder preferably tapering from one end to the other and supported in the opposite walls of its housing to be rotated and thereby tend to direct the tailings toward its smaller end where they discharge through an opening 8 underneath it (Fig. 5) in the adjacent wall of the housing; and continuous rotary motion may be imparted to the drum, during the operation of the apparatus, by a screw-gear 14 on the drum-shaft, and an operating endless screw 15, or other equivalent means. The molten material which escapes from the chamber 1 at the outlet 6 flows upon the rotating drum 7, and the metal in the mass, charged with positive electricity in the chamber 1, and which thus becomes of the nature of an electrolyte in the chamber containing the drum, is caused by the negatively charged drum, which is thus in the nature of a cathode, to deposit on the latter the metal. The metal may be removed from the rotating drum as it deposits thereon by means of a scraper 9, whence it discharges into a suitable receiver 10, while the tailings pass off at the smaller end of the drum through the outlet 8 into a receiver 11. During the operation, the drum 7 should be subjected to artificial cooling by the flow through it of a current of water directed through induction and eduction pipes 12 and 13 communicating with the interior of the drum, as illustrated in Fig. 4, and communicating with a suitable water-supply. (Not shown.) In like manner the negative electrode 3 may be kept from overheating by a flow of water through it, the electrode being of a hollow construction for the purpose.

My metal-separating apparatus containing the cathode-like body 7, is termed secondary with reference to the apparatus containing the electric arc as the fusing medium. Obviously, however it may itself be an independent apparatus for the electrical treatment of the mass reduced to the necessary molten condition in the chamber 1 of any other apparatus, whether electrically operated or otherwise; when, of course, means for charging the molten mass entering the chamber which houses the drum 7 with a positive (as from an electrode 2) as well as with a negative current from a generator will be provided.

What I claim as new, and desire to secure by Letters Patent, is—

1. In an electric metal-separator, the combination of a metal body rotatably supported in a suitable housing and forming the negative pole of an electric generator, an inlet leading to the said body for the molten mass to be treated, a chamber for the supply of said molten mass discharging through the inlet into said housing and a positive pole of the generator in the path of the molten mass to said body, substantially as and for the purpose set forth.

2. In an electric metal-separator, the combination of a tapering metal drum rotatably supported in a suitable housing and provided with means for rotating it and with water induction and eduction pipes communicating with the interior of the drum, said drum forming the negative pole of an electric generator, a metal-outlet in said housing and a slag-outlet therein at the tapering end of the drum, a scraper for the drum, and a positive pole of the generator in the path of the molten mass to the drum, substantially as and for the purpose set forth.

3. In an apparatus for separating metals by electric action, the combination of the fusion-chamber 1, the arc-electrodes 2 and 3 in a generator-circuit and extending into said chamber, and the extractor communicating with the fusion-chamber and containing a movably supported metallic surface connected with the negative pole of a generator, substantially as set forth.

4. In an apparatus for separating metals by electric action, the combination of the fusion-chamber 1, the arc-electrodes 2 and 3 in a generator-circuit, and extending into said chamber, the resistance-box 16 arranged in the circuit, and the extractor communicating with the fusion-chamber and containing a movably supported metal surface connected with the negative pole of a generator, substantially as set forth.

5. In an apparatus for the separation of metals by electric action, the combination of the fusion-chamber 1, the arc-electrodes 2 and 3 in a generator-circuit and extending into said chamber, and the extractor communicating with the fusion-chamber and containing a rotatably supported metallic drum connected with the negative pole of a generator, substantially as set forth.

6. In an apparatus for the separation of metals by electric action, the combination of the fusion-chamber 1, the arc-electrodes 2 and 3 in a generator-circuit and extending into said chamber, the resistance-box 16 arranged in the circuit, and the extractor communicating with the fusion-chamber and containing a rotatably supported metallic drum connected with the negative pole of a generator, substantially as set forth.

7. In an apparatus for the separation of metals by electric action, the combination of the fusion-chamber 1, the arc-electrodes 2 and 3 in a generator-circuit and extending into said chamber, and the extractor communicating with the fusion-chamber and containing a rotatably supported tapering metallic drum connected with the negative pole of a generator, substantially as set forth.

8. In an apparatus for the separation of metals by electric action, the combination of the fusion-chamber 1, the arc-electrodes 2 and 3 in a generator-circuit and extending into said chamber, and the extractor communicating with the fusion-chamber and containing a rotatably supported metallic drum connected with the negative pole of a generator and provided with pipes for circulating water through it, substantially as set forth.

9. In an apparatus for separating metals by electric action, the combination of the fusion-chamber 1, the arc-electrodes 2 and 3 in a generator-circuit and extending into said chamber, the negative electrode 3 being hollow for the passage of a cooling current of water, and the extractor communicating with the fusion-chamber and containing a movably supported metallic surface connected with the negative pole of a generator, substantially as set forth.

Signed at Chicago, Cook county, Illinois, this 25th day of January, 1892.

ALFRED GUILLAUME.

In presence of—
ROBERT BURNS,
GEO. H. ARTHUR.